US010623388B2

(12) United States Patent
Taratine et al.

(10) Patent No.: US 10,623,388 B2
(45) Date of Patent: Apr. 14, 2020

(54) ACCOUNT ASSOCIATION SYSTEMS AND METHODS

(71) Applicant: VISA EUROPE LIMITED, London (GB)

(72) Inventors: Boris Taratine, London (GB); Malcolm Lewis, London (GB)

(73) Assignee: Visa Europe Limited, London (GB)

( * ) Notice: Subject to any disclaimer, the term of this patent is extended or adjusted under 35 U.S.C. 154(b) by 255 days.

(21) Appl. No.: 15/073,341

(22) Filed: Mar. 17, 2016

(65) Prior Publication Data

US 2016/0197904 A1    Jul. 7, 2016

Related U.S. Application Data

(63) Continuation of application No. PCT/GB2014/052757, filed on Sep. 11, 2014.

(30) Foreign Application Priority Data

Sep. 19, 2013   (GB) .................................. 1316673.1

(51) Int. Cl.
*H04L 29/06*   (2006.01)
*G06Q 50/00*   (2012.01)

(52) U.S. Cl.
CPC ............. *H04L 63/08* (2013.01); *G06Q 50/01* (2013.01); *H04L 63/102* (2013.01)

(58) Field of Classification Search
CPC .... G06Q 20/10; G06Q 20/4014; G06Q 20/40; G06Q 20/12; G06Q 20/227; G06Q 20/3223; G06Q 20/36; G06Q 20/401; G06Q 50/01; G06Q 40/02; G06Q 20/3572; G06Q 20/367
See application file for complete search history.

(56) References Cited

U.S. PATENT DOCUMENTS

| 6,202,055 B1 | 3/2001 | Houvener et al. |
| 6,665,389 B1 | 12/2003 | Haste, III |
| 2006/0195816 A1* | 8/2006 | Grandcolas ............ G06Q 40/02 717/101 |

(Continued)

OTHER PUBLICATIONS

International Search Report and Written Opinion dated Mar. 3, 2015 for PCT Application No. PCT/GB2014/052757.

(Continued)

*Primary Examiner* — Tae K Kim
(74) *Attorney, Agent, or Firm* — Kilpatrick Townsend & Stockton LLP

(57) ABSTRACT

Embodiments of the present disclosure comprise methods, apparatus and computer readable instructions for establishing a relationship between user accounts. An account association request message in relation in relation to a first user account and a second user account is received. The account identifier for the first user account and the account identifier for the second user account is determined based on the account association request message. A profile information message is transmitted on the basis of the account identifier for the second user account and in response, a profile information response message is received. A relationship between the first user account and the second user account is established least in response to receipt of the profile information response message.

17 Claims, 5 Drawing Sheets

(56) References Cited

U.S. PATENT DOCUMENTS

| | | | |
|---|---|---|---|
| 2007/0019616 A1 | 1/2007 | Rantapuska et al. | |
| 2009/0113006 A1 | 4/2009 | McWana | |
| 2010/0042539 A1* | 2/2010 | Dheer | G06Q 20/10 705/40 |
| 2010/0174620 A1* | 7/2010 | Stringfellow | G06Q 20/02 705/26.1 |
| 2011/0099107 A1* | 4/2011 | Saxena | G06Q 20/108 705/42 |
| 2011/0145152 A1* | 6/2011 | McCown | G06Q 20/02 705/67 |
| 2011/0196787 A1 | 8/2011 | Alroy et al. | |
| 2012/0150669 A1* | 6/2012 | Langley | G06Q 30/0601 705/16 |
| 2012/0215688 A1* | 8/2012 | Musser | G06Q 20/102 705/40 |
| 2013/0060689 A1* | 3/2013 | Oskolkov | G06Q 20/10 705/42 |
| 2013/0097233 A1* | 4/2013 | Raman | G06Q 10/10 709/204 |
| 2013/0173712 A1* | 7/2013 | Monjas Llorente | G06Q 10/00 709/204 |
| 2014/0215578 A1* | 7/2014 | Lessin | G06Q 50/01 726/4 |
| 2014/0229388 A1* | 8/2014 | Pereira | G06Q 20/38215 705/76 |
| 2014/0279444 A1* | 9/2014 | Kassemi | G06Q 20/102 705/39 |
| 2015/0371221 A1* | 12/2015 | Wardman | G06Q 20/3674 705/67 |
| 2016/0358174 A1* | 12/2016 | Kassemi | H04L 67/02 |
| 2017/0093784 A1* | 3/2017 | McKay | H04L 63/1466 |
| 2017/0148018 A1* | 5/2017 | Levin | G06Q 20/202 |

OTHER PUBLICATIONS

UKIPO Search Report dated Feb. 28, 2014 for GB Application No. GB1316673.1.

* cited by examiner

ACCOUNT ASSOCIATION SYSTEMS AND METHODS

CROSS-REFERENCE TO RELATED APPLICATIONS

This application is a continuation International Application No. PCT/GB2014/052757 filed Sep. 11, 2014, which claims the benefit of U.K. Application No. 1316673.1, filed Sep. 19, 2013. Each of the above-referenced patent applications is incorporated by reference in its entirety.

BACKGROUND OF THE INVENTION

Field of the Invention

The present invention relates to account based systems, and in particular to establishing relationships between user accounts in an account based system.

Description of the Related Technology

Many systems exist in which users of the system are required to hold accounts. Examples of such account based systems include financial institutions, such as banks, where users are commonly required to hold an account with which their level of funds or other financial data is associated. Similarly, many internet based services require users to hold accounts in order to use the service. Examples of such services include social networks and other online communities. Association between two or more user accounts is a desirable feature of many account based systems. In the case of banking systems, a user's account may include a list of payee accounts to which they can more easily transfer funds. In the case of an online community, association between user accounts may enable the transfer of data between the users of the associated accounts, such as communications data or shared data files. In some account based systems, due to the functionality that is provided by associating user accounts, it may be appropriate to provide one user with a level of assurance in the identity of another user before establishing such an association between their user accounts. However, establishing trusted relationships between user accounts can be difficult, especially in systems where there is a requirement not to expose account details to users of other accounts with which no association has yet been established.

Some known account based systems use account identifiers that are not easily recognizable to users of the system. For example, in the context of banking systems, accounts are typically identified to other users on the basis of unique account numbers, or account number and sort code combinations. Such systems expose users to the risk of transposition errors when adding another user to their list of payees, because errors made when entering such an account identifier may not be readily noticeable to the user. Despite some systems employing mechanisms for detecting transposition errors, there remains a risk that such errors may result in failure of payments, or payments being made to unintended recipients, which are clearly undesirable.

Alternative known systems may utilize more generic identifiers, such as user configurable account names. For example, in the context of social networks, a user may have the option of associating a publicly available "display name" with their account. However, in order to allow users to use the display name that they desire, such identifiers are typically not unique within the account based system. Such systems may expose their users to the risk of targeted identity spoofing, whereby an account may be established by a malicious party in order to solicit association requests from users intending to associate with the legitimate user account. In other words, it may be difficult to provide a user with an account identifier for their user account that is easily recognizable by others, and that is unique and genuine. Relationships that are unintentionally established with a spoofed account may lead to the unwanted acquisition of private data, or other valued assets, by the malicious party.

Hence it would be desirable to provide measures for establishing a relationship between user accounts that overcome one or more of these problems.

SUMMARY OF THE INVENTION

In accordance with embodiments of the present invention, there is provided a method, apparatus and computer software for establishing a relationship between user accounts according to the appended claims.

More specifically, in a first aspect, there is provided a method for establishing a relationship between a first user account corresponding to a first user of an account based system and a second user account corresponding to a second user of the account based system, each respective user account having an account identifier and one or more items of profile identity information associated with the corresponding user, at least one item of profile identity information having been assured by a trusted identity provider and initially being unavailable to users of the account system other than said corresponding user, the method comprising: receiving an account association request message in relation to the first user account and the second user account; determining, on the basis of the account association request message, the account identifier for the first user account and the account identifier for the second user account; identifying, on the basis of the account identifier for the first user account, a first said item of profile identity information that is initially unavailable to users of the account system other than said corresponding user, the first said item of profile identity information being associated with the first user; transmitting, on the basis of the account identifier for the second user account, a profile information message, the profile information message relating to the first said item of profile identity information; receiving a profile information response message in response to transmission of the profile information message, the profile information response message comprising information relating to the first said item of profile identity information; and establishing a relationship between the first user account and the second user account at least in response to receipt of the profile information response message.

The above method provides the second user of the account based system with assurance as regards the identity of the first user of the account based system prior to the establishment of the relationship between the first user account and the second user account. In this manner, the second user is provided with an opportunity to prevent the establishment of the relationship between the user accounts if the first user is not the user with whom the second user intended the relationship to be established (for example, as a result of a transposition error, or the interception and malicious manipulation of the account association request message).

In some arrangements, the profile information message comprises the first said item of profile identity information, whereby to make the first said item of profile identity information available to the second user. Hence, the second user of the account based system is provided with assurance in the identity of the first user of the account based system by revealing to the second user an item of otherwise unavailable profile identity information relating to the first user. The second user is thereby enabled to review the profile identity information relating to the first user to ensure that the first user is the user with whom the second user intended the relationship to be established.

In other arrangements, the profile information message comprises a profile information challenge message configured to request the first said item of profile identity information, and wherein said profile information response message comprises a received item of profile identity information. Hence, the second user of the account based system is assured that a relationship will only be established with the first user of the account based system if they are able to supply an item of profile identity information that corresponds to the first user's trusted profile identity information.

Embodiments may involve the steps of: receiving, prior to receipt of the account association request message, a token request message in relation to one of the first user account and the second user account, and transmitting a token response message in response to receipt of the identifier request message, the token response message comprising a token corresponding to said one of the first user account and the second user account.

Hence, a suitable method for distributing the necessary parameters for formulating an account association request message is enabled. Further, the difficulty associated with transmitting unsolicited association request messages is increased because the initiating user would require the target user's token to be able to do so.

According to some embodiments, the token is encrypted. Hence, the contents of the token are prevented from being obtained by third parties. In some embodiments, the contents of the token may comprise account data, which the user may prefer to keep private.

In some embodiments, the token is cryptographically signed. Hence, token authenticity and/or non-repudiation may be provided.

In some arrangements, the token comprises a timestamp relating to at least one of the date and the time that the token was generated. Hence, use of the token may be time-limited, such that use of the token outside of a determined time period may be rejected in order to reduce the risk of unintended or malicious usage.

Embodiments may involve the steps of: identifying, on the basis of the account identifier for the second user account, a second said item of profile identity information, the second said item of profile identity information being associated with the second user; transmitting, in response to receipt of said profile identity confirmation message, a further profile information message, the further profile information message relating to the second said item of profile identity information; and receiving a further profile identity response message in response to transmission of the profile information message, the further profile identity response message comprising information relating to the second said item of profile identity information; wherein the relationship between the first user account and the second user account is established further in response to receipt of the further profile confirmation message.

Hence, bi-directional (or "mutual") assurance is provided, such that the first user is assured of the identity of the second user and the second user is assured of the identity of the first user, prior to establishment of the respective relationships.

In some arrangements, the further profile information message comprises the second said item of profile identity information, whereby to make the second said item of profile identity information available to the first user. Hence, the first user of the account based system is provided with assurance in the identity of the second user of the account based system by revealing to the first user an item of otherwise unavailable profile identity information relating to the second user. The first user is thereby enabled to review the profile identity information relating to the second user to ensure that the second user is the user with whom the first user intended the relationship to be established.

In other arrangements, the further profile information message comprises a further profile information challenge message configured to request the second said item of profile identity information, and wherein said further profile information response message comprises a further received item of profile identity information. Hence, the first user of the account based system is assured that a relationship will only be established with the second user of the account based system if the item of profile identity information that they supplied corresponds to the second user's trusted profile identity information.

In certain embodiments, the first user account and the second user account may each be held with a financial institution. This facilitates creation of relationships that enable the transfer of funds between accounts at the respective financial institutions, while providing assurance to the corresponding users of the account based system of each other's identities.

According to yet further aspects of the present invention there are provided apparatus for establishing a relationship between user accounts according to one or more of the aforesaid methods, and computer programs, comprising a set of instructions, which, when executed by a computing device, cause the computing device to perform steps of the aforesaid methods.

Further features and advantages of the invention will become apparent from the following description of embodiments of the invention, given by way of example only, which is made with reference to the accompanying drawings.

DETAILED DESCRIPTION OF CERTAIN INVENTIVE EMBODIMENTS

The present disclosure leverages information held by a trusted identity provider relating to users of an account based system to provide secure measures for establishing relationships between user accounts in the account based system.

Figure 1:
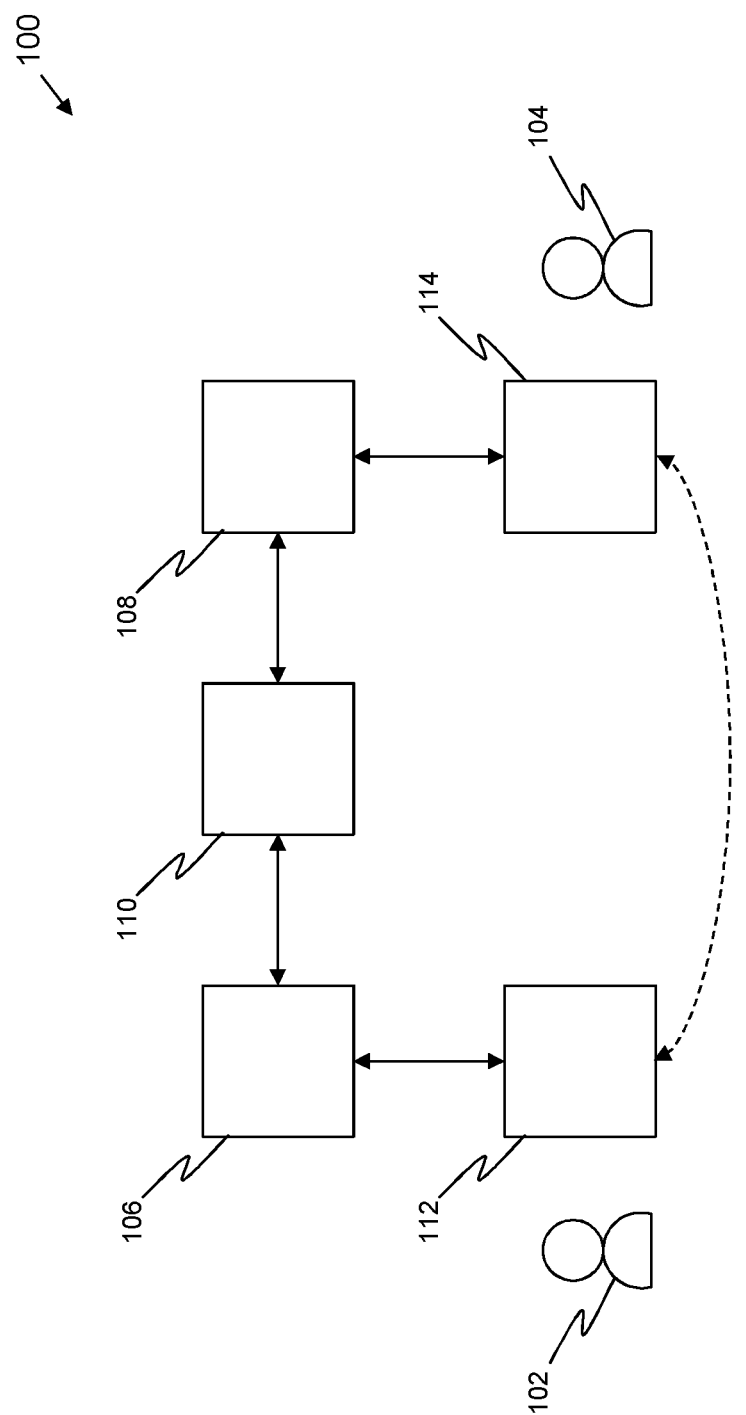
FIG. 1 shows an example account based system in which embodiments of the present disclosure may be practiced.

FIG. 1 illustrates an example account based system 100 in which embodiments of the present disclosure may be practiced. Users 102 and 104 each hold accounts within the account based system 100. In the embodiments depicted in FIG. 1, user 102 holds an account with service provider entity 106, whereas user 104 holds an account with service provider entity 108. In alternative embodiments, users 102 and 104 may both hold accounts with the same service provider entity. Service provider entities 106 and 108 may, for example, correspond to financial service providers, such as banks. In such embodiments, the user accounts may be banking accounts. Alternatively, service provider entities 106 and 108 may correspond to internet based service providers, such as social networks or other internet based communities. In such embodiments, the user accounts may be referred to as user profile accounts. In embodiments, service provider entities 106 and 108 are each embodied by a server, or group of servers, associated with the corresponding service provider.

Service provider entities 106 and 108 are capable of conducting communications with account association entity 110. Service provider entities 106 and 108 may communicate with account association entity 110 via a public network such as the internet, via one or more real or virtual private networks or via dedicated communication channels. According to embodiments, account association entity 110 is embodied by a server, or group of servers.

User 102 is capable of accessing their user account with service provider entity 106 via one or more user devices, including user device 112. In alternative embodiments, user 102 may access their user account with service provider entity 106 in person at a geographical location associated with the service provider, such as a branch of a banking institution. User devices may include any devices capable of conducting communications via a network, including, for example, personal computers, laptop computers, mobile telephones (including smartphones), personal digital assistants (PDAs) and tablet computers. User device 112 is capable of communicating with service provider entity 106 via a communications network such at the internet to access the user account associated with user 102. Similarly, user 104 is capable of accessing her user account with service provider entity 108 via one or more user devices, including user device 114. User device 114 is capable of communicating with service provider entity 108 via a communications network such at the internet to access the user account associated with user 104. In order to access their user accounts, users 102 and 104 may be required to complete an authentication (or "log in") procedure via their associated user device in order to prove their identities to the respective service provider entities.

In the embodiments depicted in FIG. 1, service provider entities 106 and 108 also comprise identity provider entities. In their capacity of identity providers, service provider entities 106 and 108 hold profile identity information corresponding to users of one or more user accounts, including users 102 and 104 respectively. The profile identity information held by an identity provider for a given user account includes one or more items of profile identity information that are unavailable to other users of account based system 100. By referring to an item of profile identity information corresponding to a given user account as "unavailable", it is to be understood that this item of profile identity information is inaccessible to other users of the account based system without either initiating an account association process in relation to the given user account, or having an established relationship with the given user account.

In some arrangements, the profile identity information describes the corresponding user. Such profile identity information may include, for example, a name of the user, an address of the user, the date of birth of the user, a nationality of the user, a photograph of the user, etc. In some arrangements, the profile identity information is authorized by the corresponding user, but not describe that user; for example, such an item of profile identity information may comprise a photograph of the given user's pet, which may be recognizable to genuine friends of that user, but is difficult for someone that is not a genuine friend to use to identify the corresponding user. The veracity of this profile identity information is assured by the respective identity provider, for example as a result of one or more due diligence or identity verification activities previously performed by the identity provider. In embodiments where the service provider entity is the identity provider, the due diligence activity may be performed at the time of creation of the account, and may for example comprise a Know Your Customer (KYC) activity. Items of profile identity information held by service provider entities 106 and 108 in their capacities as identity providers may be transmitted to, or accessed by, account association entity 110 for the purposes of enabling the secure account association measures of embodiments of the present disclosure.

Service provider entities 106 and 108 are trusted by account association entity 110 in their capacities as identity providers, for example as a result of an established agreement between the entities. As a result, the veracity of items of profile identity information provided by a trusted identity provider is trusted by account association entity 110. Items of profile identity information provided by a trusted identity provider may be stored by account association entity 110 for later use, for example in a database. Alternatively, the items of profile identity information may be stored by the trusted identity provider entity such that they can be accessed directly by account association entity 110 as required.

Figure 2:
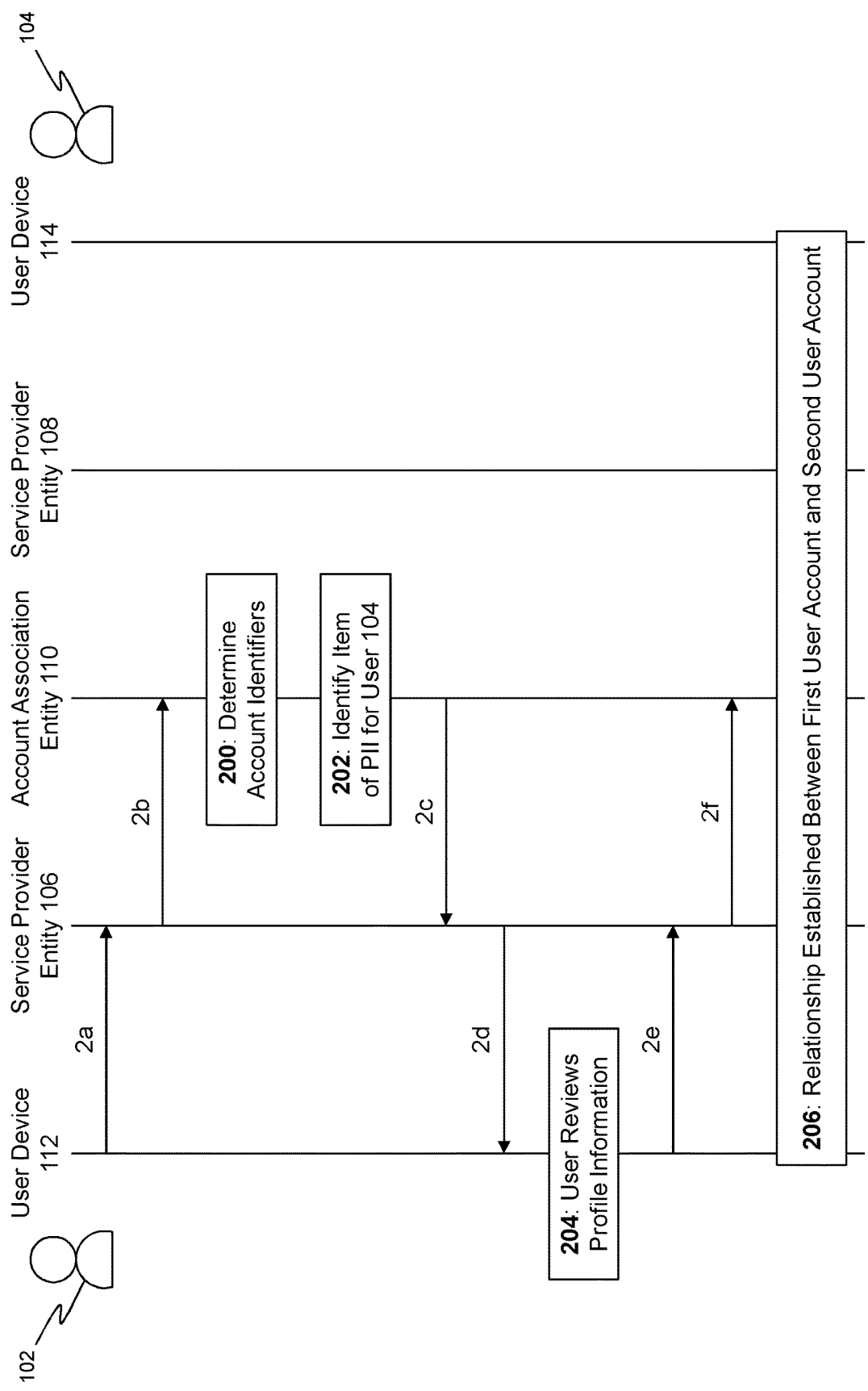
FIG. 2 shows a message flow diagram illustrating the operation of an account association entity for establishing relationships between user accounts according to embodiments.

FIG. 2 shows a message flow diagram illustrating the operation of account association entity 110 for establishing relationships between user accounts according to embodiments. In this example user 102 wishes to establish a relationship between their account and the account of user 104. Prior to the beginning of the message flow, user 102 may have performed any necessary steps to gain access to their user account via user device 112. This account access procedure may comprise one or more authentication or verification messages being transmitted between user device 112 and service provider entity 106 (not shown). At step 2a, user 102 initiates the account association process by transmitting an account association request message from user device 112 to service provider entity 106. Hence, user 102 is referred to as the initiating user. The account association request message comprises data which identifies the user account with which initiating user 102 wishes to establish a relationship, in this case the account associated with user 104. Hence user 104 is referred to as the target user. The initiating user 102 identifies the user account of target user 104 (hereinafter the target user account) by entering, via user device 112, an account identifier corresponding to target user account. The account identifier for the target user account is then included in account association request message 2a.

In response to receipt of account association request message 2a, the service provider transmits account association request message 2b to account association entity 110.

Account association request message 2b comprises sufficient data to identify the user account of initiating user 102 (hereinafter the initiating user account) and the target user account to account association entity 110. For example, service provider entity 106 may insert an account identifier for the initiating user account into account association request message 2b on the basis of a previous account access procedure performed by initiating user 102 via user device 112.

Having received account association request message 2b, account association entity 110 is configured to determine an initiating account identifier (i.e. an identifier for the initiating user account) and a target account identifier (i.e. an identifier for the target user account) on the basis of the account association request message, as shown by step 200. This determination comprises parsing appropriate parameters from account association request message 2b. Once the initiating user account identifier and the target user account identifier have been determined, account association entity 110 is configured to identify an item of assured profile identity information corresponding to the initiating user account identifier and/or the target user account identifier.

In the example shown in FIG. 2, account association entity 110 is configured to identify an item of assured profile identity information corresponding to the target user account identifier, i.e. an item of profile identity information for target user 104 that has been assured by service provider entity 108 in its capacity as a trusted identity provider, as shown by step 202. The item of profile identity information is retrieved from memory by account association entity 110, for example by looking up the appropriate account identifier in a database. In alternative embodiments, the item of profile identity information may be retrieved by querying the appropriate identity provider in relation to the account identifier, for example, by transmitting a profile identity information request message comprising the account identifier and receiving a corresponding profile identity information response message comprising the item of profile identity information.

Having identified the item of assured profile identity information corresponding to the target user account identifier, account association entity 110 is configured to transmit that item of assured profile identity information to service provider entity 106 in profile information message 2c. The profile information message may also comprise the initiating account identifier, in order to inform service provider entity 106 of the initiating user account to which profile information message 2c relates. In response to receipt of profile information message 2c, service provider entity 106 is configured to reveal the item of profile identity information comprised in profile information message 2c, to initiating user 102 by transmitting the item of profile identity information to user device 112 in profile information message 2d. The item of profile identity information corresponding to target user 104 is thereby made available to the initiating user 102, who may subsequently review the item of profile information via user device 112, for example by viewing the item of profile information via a display on user device 112, or by listening to the item of profile information via a speaker on user device 112 etc. User 102 is thereby enabled to review, at step 204, assured profile identity information relating to target user 104 such that they can verify that target user 104 is the user with whom they intended to establish a relationship.

Initiating user 102 may respond to profile information message 2c by transmitting a profile information response message to service provider entity 106 via user device 112. In the embodiments shown in FIG. 2, initiating user 102 verifies that the revealed item of profile identity information relates to the intended target user, and transmits the profile information response message in the form of profile identity confirmation message 2e to service provider entity 106 via user device 112. In response to receipt of profile identity confirmation message 2e, service provider entity 106 is configured to send profile identity confirmation message 2f to account association entity 110. Profile identity confirmation message 2f comprises profile identify confirmation information relating to the revealed item of profile identity information. Having received profile identity confirmation message 2f, account association entity 110 is equipped to establish a relationship between the initiating user account and the target user account, and does so at step 206. In some embodiments, establishment of the relationship at step 206 comprises adding account information for the target user account to the user account of initiating user 102. For example, this may include adding an entry for the target user account to a list of contacts associated with the initiating user account. In the case of a banking system, the list of contacts may comprise a list of payees. In some embodiments, the account information for the user account of target user 104 may be added to the user account of initiating user 102 by service provider entity 106 responsive to receipt of the profile identity confirmation message 2e, and transmittal of profile identity confirmation message 2f may be omitted.

As described above, responsive to the initiating user 102 recognizing the revealed item of profile identity information, profile identity confirmation message 2e is transmitted to service provider entity 106. In the event that the initiating user 102 does not recognize the revealed item of profile identity information, the profile information response message may take the form of a profile identity rejection message transmitted to service provider entity 106. The account association process may then be terminated and the relationship between the user accounts would not be established. Additionally, receipt of a profile identity rejection message by a service provider entity or account association entity 110 may be used to aid in fraud detection, for example by triggering an appropriate fraud alert mechanism.

Hence, according to the embodiment described above, initiating user 102 is offered the opportunity to review and verify an element of assured profile identity information relating to the target user 104 before the relationship between the initiating user's account and the target user's account is established.

In further embodiments (not shown), instead of transmitting the item of profile identity information to user device 112 in profile information message 2d, account association entity 110 may be configured to challenge user 102 to provide an item of profile identity information, namely profile identity information relating to the target user 104. In such embodiments, profile information message 2d comprises a profile information challenge message. In response to receipt of the profile information challenge message, service provider entity 106 is configured to transmit the profile information challenge message on to user device 112. Initiating user 102 may then respond to the profile information challenge message, by transmitting the requested item of profile identity information relating to target user 104 back to service provider entity 106 in the profile information response message. In response to receipt of the profile information response message, service provider entity 106 is configured to transmit the profile information response message on to account association entity 110. Account association entity 110 may then compare the item of profile identity information received in the profile information response message with the item of assured profile identity information corresponding to the target user account identifier. If the result of the comparison is to determine a match between the received item of profile identity information and the assured item of profile identity information, account association entity 110 is equipped to establish a relationship between the initiating user account and the target user account. Such embodiments prevent the item of profile information from being unnecessarily revealed to initiating user 102.

In alternative embodiments, the target user may instead be offered the opportunity to review and verify an element of assured profile identity information relating to the initiating user before the relationship between the initiating user's account and the target user's account is established. Such embodiments provide the target user with assurance of the identity of the initiating user. This embodiment will now be described with reference to FIG. 3. Account association request message 3a, account association request message 3b, and step 300 are equivalent to the corresponding messages 2a, 2b, and step 200 described in relation to FIG. 2. However, in the embodiments shown in FIG. 3, account association entity 110 is configured to identify an item of assured profile identity information corresponding to the initiating user account identifier, i.e. an item of profile identity information for initiating user 102 that has been assured by service provider entity 106 in its capacity as an identity provider, as shown by step 302.

Having identified the item of assured profile identity information corresponding to the initiating user account identifier, account association entity 110 is configured to transmit that item of assured profile identity information to service provider entity 108 in profile information message 3c. The profile information message may also comprise the target account identifier, in order to inform service provider entity 108 of the target user account that profile information message 3c relates to. In response to receiving profile information message 3c, service provider entity 108 is configured to reveal the item of profile identity information comprised in profile information message 3c, to target user 104 by transmitting the item of profile identity information to user device 114 in profile information message 3d. The item of profile identity information corresponding to initiating user 102 is then revealed to target user 104 in response to receipt of profile information message 3d by user device 114. User 104 is thereby enabled to review, at step 304, assured profile identity information relating to initiating user 102 so that they can verify that initiating user 102 is the user that is associated with the account with which they expected to establish a relationship. Alternatively, as described previously, account association entity 110 may be configured to transmit a profile information challenge message to user device 114 (e.g. via service provider entity 108) in order to confirm the relationship without unnecessarily revealing the item of profile identity information to target user 104.

Figure 3:
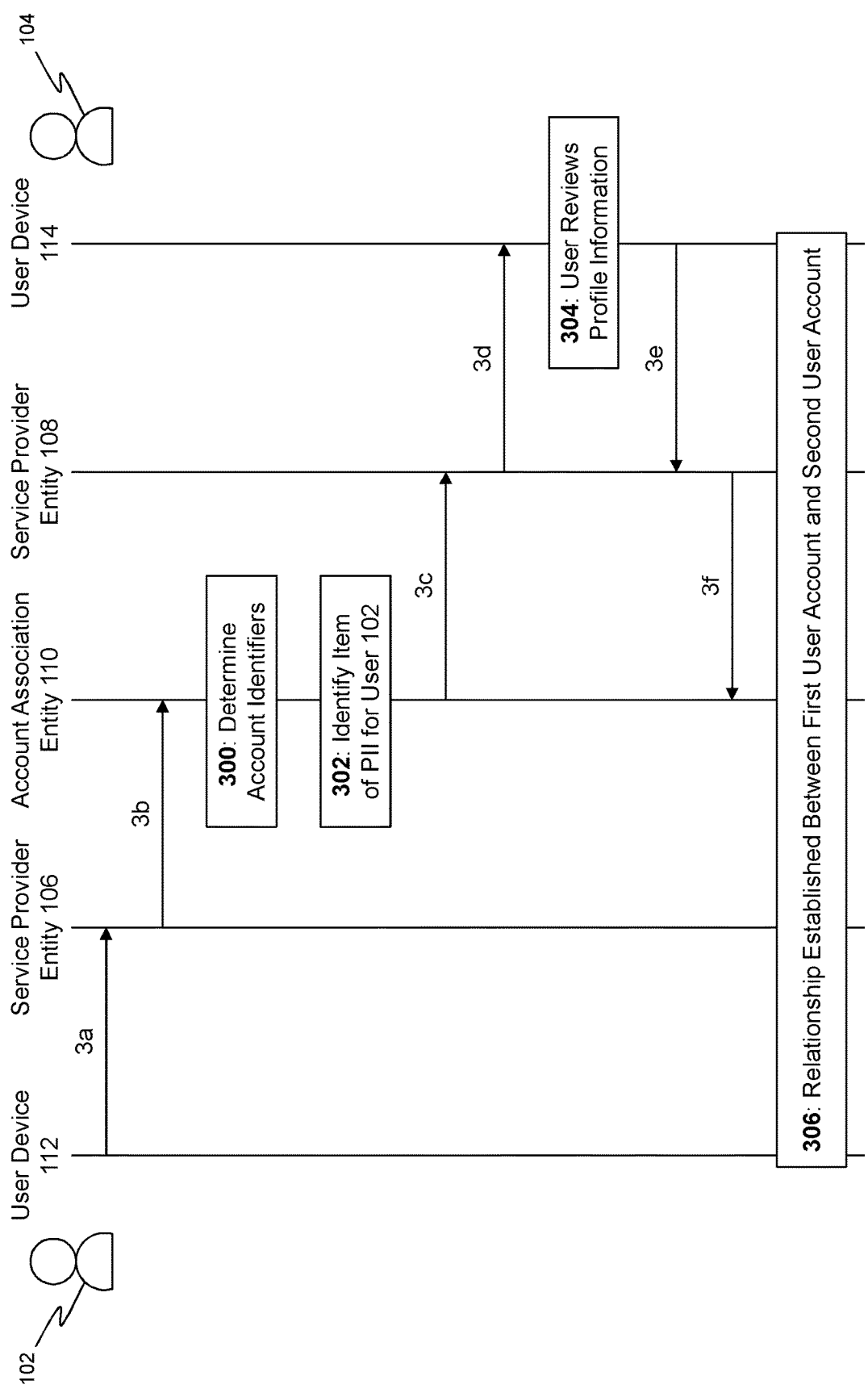
FIG. 3 shows a message flow diagram illustrating the operation of an account association entity for establishing relationships between user accounts according to alternative embodiments.

In the embodiments shown in FIG. 3, target user 104 verifies that the revealed item of profile identity information relates to the expected initiating user, and transmits profile identity confirmation message 3e to service provider entity 108 via user device 114. In response to receipt of profile identity confirmation message 3e, service provider entity 108 is configured to send profile identity confirmation message 3f to account association entity 110. Profile identity confirmation message 3f comprises profile identify confirmation information relating to the revealed item of profile identity information. Having received profile identity confirmation message 3f, account association entity 110 is equipped to establish a relationship between the user account of the initiating user 102 and the user account of the target user 104, and does so at step 306. In some embodiments, establishment of the relationship at step 306 comprises adding account information for the user account of initiating user 102 to the user account of target user 104. In some such embodiments, the account information for the user account of initiating user 102 may be added to the user account of target user 104 by service provider entity 108, and transmittal of profile identity confirmation message 3f may be omitted.

Hence, in this embodiment, target user 104 is offered the opportunity to review and verify an element of assured profile identity information relating to initiating user 102 before the relationship between the initiating user's account and the target user's account is established. Such embodiments are less susceptible to profile identity information harvesting attempts by a malicious initiating party because transmission of a spurious account association request message does not result in profile identity information for the target user being revealed to the malicious initiating party. Rather, transmission of spurious account association messages by a malicious initiating party merely results in the malicious initiating party's profile identity information being revealed to each target party. In the event that the target user does not recognize the initiating user, the target user 104 can return a message indicating that they do not wish to be associated with the initiating user. As a result neither the account association entity 110 nor the service provider entity 108 will create an association between the malicious initiating party and the target user 104.

It can be seen that the processes described above in relation to FIGS. 2 and 3 enable identity confidence in one direction. For example, the process described in relation to FIG. 2 results in initiating user 102 being assured of the identity of the user associated with the target user account (i.e. target user 104), but not vice versa. Hence, user 102 is thereafter equipped to send data or funds to user 104 with assurance of receipt, or receive messages from user 104 with message origin authentication. Conversely, the process described in relation to FIG. 3 results in target user 104 being assured of the identity of the user associated with the initiating user account (i.e. initiating user 102), but not vice versa.

Other embodiments provide measures that enable bi-directional assurance, such that initiating user 102 is assured of the identity of the target user 104 and vice versa. In such embodiments, rather than establishing the relationship between the user accounts directly in response to receipt of a profile identity confirmation message (e.g. 2f or 3f), additional steps may be carried out prior to the establishment of the relationship.

Figure 4:
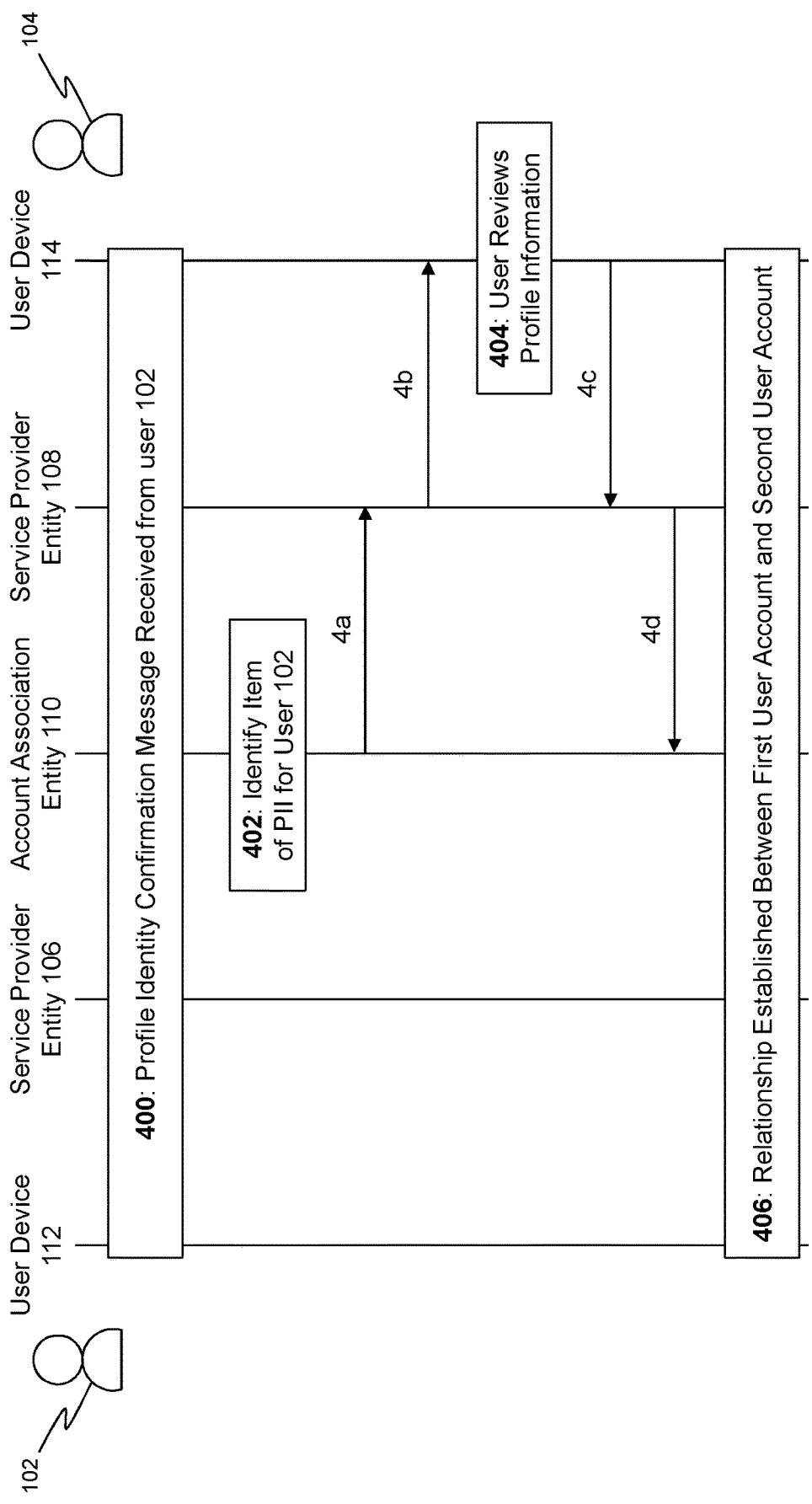
FIG. 4 shows a message flow diagram illustrating the operation of an account association entity for establishing relationships between user accounts according to further embodiments.

FIG. 4 shows a message flow diagram illustrating the operation of account association entity 110 for establishing relationships between user accounts according to such embodiments. In the embodiments shown in FIG. 4 a profile identity confirmation message has already been received from a user, in this case user 102 as shown in step 400, for example as previously described in relation to FIG. 2 (up to receipt of profile identity confirmation message 2f. In response to receipt of a profile identity confirmation message comprising profile identity confirmation information relating to an item of profile identity information corresponding to one of the initiating user account identifier and the target user account identifier, the account association entity 110 is configured to identify a further item of assured profile identity information corresponding to the other of the initiating user account identifier and the target user account identifier.

In the example depicted in FIG. 4, the received profile identity confirmation message comprised profile identity confirmation information corresponding to the target user account identifier. In response to receipt of the profile identity confirmation message, account association entity 110 is configured to identify a further item of assured profile identity information corresponding to the initiating user account identifier, i.e. an item of profile identity information for initiating user 102 that has been assured by service provider entity 106 in its capacity as an identity provider, as shown by step 402.

Having identified the further item of assured profile identity information corresponding to the initiating user account identifier, account association entity 110 is configured to transmit that further item of assured profile identity information to service provider entity 108 in further profile information message 4a. Further profile information message 4a may also comprise the target user account identifier, in order to inform service provider entity 108 of the target user account to which further profile information message 4a relates. In response to receipt of further profile information message 4a, service provider entity 108 is configured to reveal the further item of profile identity information comprised in further profile information message 4c, to target user 104 by transmitting the further item of profile identity information to user device 114 in further profile information message 4b. The further item of profile identity information corresponding to initiating user 102 is then revealed to target user 104 in response to receipt of further profile information message 4b by user device 114. User 104 is thereby enabled to review, at step 404, assured profile identity information relating to initiating user 102 so that they can verify that initiating user 102 is a user that is associated with an account with which they wish to establish a relationship.

In the example shown in FIG. 4, target user 104 verifies the revealed further item of profile identity information, and transmits further profile identity confirmation message 4c to service provider entity 108 via user device 114. In response to receipt of further profile identity confirmation message 4c, service provider entity 108 is configured to send further profile identity confirmation message 4d to account association entity 110. Further profile identity confirmation message 4d comprises further profile identity confirmation information relating to the revealed further item of profile identity information. Having received further profile identity confirmation message 4d, account association entity 110 is equipped to establish a mutual relationship between the user account of the initiating user 102 and the user account of the target user 104, and does so at step 406. In some embodiments, establishment of the relationship at step 406 comprises adding account information for the user account of initiating user 102 to the user account of target user 104, and adding account information for the user account of target user 104 to the user account of initiating user 102.

Hence, this embodiment provides a means for both initiating user 102 and target user 104 to be offered the opportunity to review and verify an element of assured profile identity information relating to the other user before the relationship between the initiating user's account and the target user's account is established. Such embodiments provide bi-directional assurance to both users in the relationship as to the identity of the other party and give both users an opportunity to reject the establishment of the relationship. In alternative embodiments, an interim relationship between the initiating user's account and the target user's account may be established in response to receipt of the profile identity confirmation message at step 400 (for example as described in step 206 of FIG. 2), with a full mutual relationship being established upon receipt of further profile identity confirmation message 4d.

Whereas, in the embodiments shown in FIG. 4, the profile identity confirmation message received at step 400 was received from initiating user 102, the technique may be similarly applied if the profile identity confirmation message is received from target user 104, for example as depicted in FIG. 3 (up to receipt of profile identity confirmation message 3f). In such embodiments, account association entity 110 is configured to identify a further item of assured profile identity information corresponding to the target user account identifier, and transmit that further item of assured profile identity information to initiating user 102 instead.

In the previously described embodiments, communications between user devices 112, 114, and account association entity 110 have been transmitted via the corresponding service provider entity. In alternative embodiments, one or more of user devices 112 and 114 may undertake at least a portion of the aforesaid communications directly with account association entity 110, for example via the internet. In such embodiments, an identifier for the user account corresponding to the user that is undertaking communications directly with account association entity 110 may be determined by account association entity 110 on the basis of having received the message from the corresponding user, for example by querying a service provider entity or an identity provider entity.

In the embodiments described above, service provider entities 106 and 108 are also identity providers for their user's accounts. In alternative embodiments, the identity providers may be one or more further, different entities in account holding system 100. Identity provider entities may conduct communications with account association entity 110 via a public network such as the internet, one or more real or virtual private networks or alternative dedicated communication channels. According to embodiments, the identity provider entities each comprise a server, or group of servers.

In some arrangements, account association entity 110 may be configured to process association requests on the basis of pre-generated tokens. In such embodiments, a user is able to retrieve a token from account association entity 110 which uniquely identifies a given one of their user accounts to account association entity 110. That user is then able to distribute the token to other users of the account based system so that the other users are able to initiate association requests with the given user account.

Figure 5:
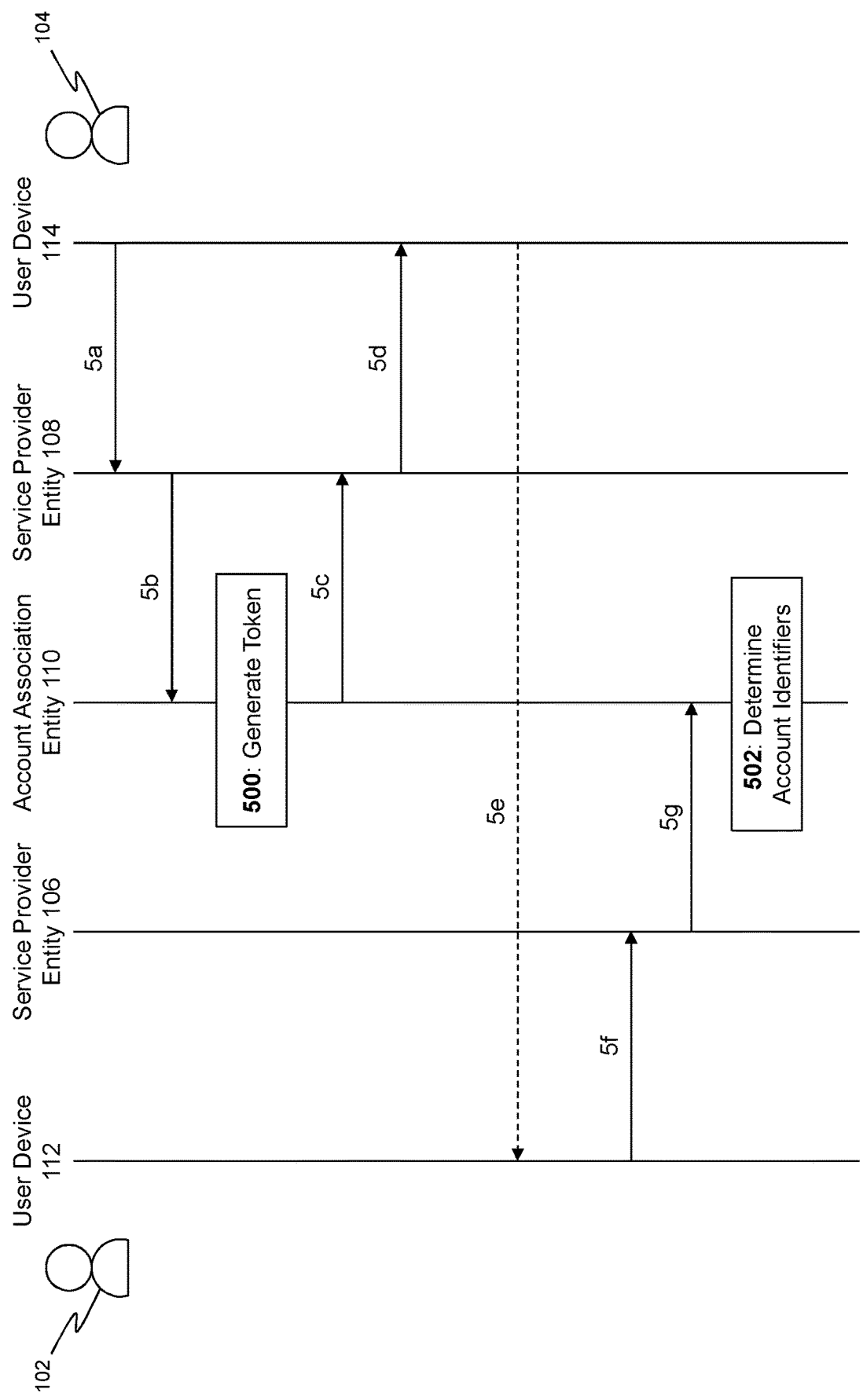
FIG. 5 shows a message flow diagram illustrating the operation of an account association entity for generating tokens according to embodiments.

FIG. 5 shows a message flow diagram illustrating the operation of account association entity 110 for generating tokens according to embodiments. At the start of the process, target user 104 wishes to provide a token to initiating user 102 so that user 102 can initiate an account association process with a user account associated with target user 104 (hereinafter the target user account), for example as previously described in relation to FIG. 2 or 3. Prior to the beginning of the message flow, user 104 may have performed any necessary steps to gain access to the target user account via user device 114. This account access procedure may involve transmission of one or more authentication or verification messages (not shown) between user device 114 and service provider entity 108. Target user 104 initially transmits token request message 5a to service provider entity 108, via user device 114, in relation to the target user account. The target user account may be identified as a result of a previous account access procedure performed by target user 104.

In response to receipt of token request message 5a, service provider entity 108 is configured to transmit token request message 5b to account association entity 110. In embodiments, token request message 5b comprises an identifier for the target user account. Having received token request message 5b, account association entity 110 is configured to generate a token for the target user account at step 500. The token is then transmitted to service provider entity 108 in token response message 5c. In response to receipt of token response message 5c, service provider entity 108 is configured to transmit token response message 5d, which includes the token for the target user account, to user device 114. Thereafter, target user 104 is equipped to distribute the token for the target user account to other users. In the embodiments depicted in FIG. 5, the target user 104 transmits the token from user device 114 to user device 112 in token transfer message 5e, in order to enable user 102 to initiate an association request with the target user account. Token transfer message 5e may be sent between the user devices via an out of band communication channel, as illustrated by the broken line in FIG. 1, for example in the form of an email, multimedia messaging service (MMS) or short message service (SMS). Even untrusted channels may be suitable for this purpose as the subsequent identity verification processes will cause any tampering with the token to become apparent.

In response to receipt of token transfer message 5e at user device 112, initiating user 102 is equipped to initiate an account association process with the target user account by transmitting the token to service provider entity 106 in account association request message 5f. In response to receipt of account association request message 5f, service provider entity 106 is configured to transmit account association request message 5g, which comprises the token for the target user account, to account association entity 110. In this example, account association request message 5g further comprises an identifier for the user account of initiating user 102. The user account of initiating user may be identified by service provider entity 106 as a result of a previous account access procedure performed by initiating user 102, and inserted into account association request message 5g. Having received account association request message 5g, account association entity 110 is configured to determine the identifier for the initiating user account as described previously, and determine the identifier for the target user account on the basis of the received token. The account association process may then be completed as in the previously described embodiments.

In one arrangement the token comprises data stored in a form that is intended to be understood only by account association entity 110. For example, the token may comprise an alphanumeric data string. Further, the token may be stored in the form of an image, such as a bar code. The account association entity may generate tokens with arbitrary content in response to receipt of a token request message, and store a mapping between the generated token and the target user account that can be queried later upon receipt of an account association request message comprising the token. In alternative embodiments, at least a portion of the token is encrypted, for example the token may comprise an encrypted identifier for the target user account, which is intended to be decrypted only by account association entity 110. By utilizing tokens as the basis of the account association process, the difficulty associated with transmitting unsolicited association request messages is increased because the initiating user requires the target user's token to be able to do so (or must be able to guess it). Additionally, the need for a user to distribute their account details is removed, which the user may prefer to keep private. In further embodiments, the token may be cryptographically signed in order to provide authenticity and/or non-repudiation. In some arrangements, one token may be associated with a group of user accounts, wherein relationships are established with all of the associated user accounts upon completion of an identity verification process. Further, a token may subsequently be used to remove one or more associations with a given user account that were established on the basis of that token.

Once a token has been generated for the target user account, the same token may be provided thereafter for all requests in relation to the target user account. In alternative embodiments, a new, different token may be generated each time a token is requested in relation to the target user account. Such tokens may be use-limited, wherein account association entity 110 is configured to process a single account association request comprising a given token. Thereafter, further association requests received by account association entity 110 that comprise the same token may be rejected by account association entity 110. This use limitation of the generated tokens serves to prevent the token being later acquired by a third party and used to initiate an account association request message in relation to the target user account.

Additionally or alternatively, such tokens may be time stamped by account association entity at the time of generation, or at the time they are supplied to the target user. Time stamping may comprise associating one or more of a time and a date with the generated token. The generated token may comprise the associated time and/or date. In further embodiments, the time stamp may be stored in memory by account association entity 110 alongside the generated token, or an identifier for the generated token. Associating a time stamp with the generated token allows the tokens to be time limited. Such time limited tokens may be required to be used in an account association request message within a predetermined timeframe, or otherwise be rejected by account association entity 110. This use limitation of the generated tokens again serves to prevent the token being intercepted, or later acquired by a third party and used to initiate an account association request message in relation to the target user account.

In some embodiments, tokens for a particular user may be generated by the service provider entity corresponding to that user, rather than the account association entity. The service provider entity can subsequently share the token with account association entity 110. For example, in response to receipt of a token request message from user device 102, service provider entity 106 may be configured to generate a token, transmit the token to account association entity 110 and also transmit the token back to user device 102 in a token response message.

The example embodiments described above can be implemented in many ways, such as program instructions stored in memory that are configured for execution by a processor, as logic circuits, as an application specific integrated circuit, as firmware, etc. For example, the embodiments can be implemented as one or more software or firmware applications, computer-implemented methods, program products stored on a computer useable medium, for execution on one or more processors (e.g., CPU, microcontroller) or other computing devices. In a particular arrangement, computer readable instructions cause a standard processor, or a set of standard processors, to be configured to perform the routines according to embodiments disclosed herein.

The above embodiments are to be understood as illustrative examples of the invention. Further embodiments of the invention are envisaged. It is to be understood that any feature described in relation to any one embodiment may be used alone, or in combination with other features described, and may also be used in combination with one or more features of any other of the embodiments, or any combination of any other of the embodiments. Furthermore, equivalents and modifications not described above may also be employed without departing from the scope of the invention, which is defined in the accompanying claims.

What is claimed is:

1. A method, comprising:

receiving, prior to receipt of an account association request message, a token request message in relation to one of a first user account and a second user account;

transmitting a token response message in response to receipt of the token request message, the token response message comprising a token corresponding to said one of the first user account and the second user account;

receiving, by an account association server via a computer network, the account association request message having information that identifies the first user account and the second user account, wherein the first user account corresponds to a first user of an account based system and the second user account corresponds to a second user of the account based system, each respective user account having an account identifier and one or more items of profile identity information associated with the corresponding user, at least one item of profile identity information having been assured by a trusted identity provider and initially being unavailable to users of the account system other than said corresponding user, the account association request originating from a first user device associated with the first user, and wherein the account association request message comprises the token;

determining, by the account association server on the basis of the account association request message, the account identifier for the first user account and the account identifier for the second user account, wherein the account identifier for said one of the first user account and the second user account is determined on the basis of the token;

identifying, by the account association server on the basis of the account identifier for the first user account, a first said item of profile identity information that is initially unavailable to users of the account system other than said corresponding user, wherein the first said item of profile identity information is associated with the first user but does not itself describe the first user, wherein the first said item of profile identity information is an image that the second user recognizes as being associated with the first user;

transmitting, by the account association server on the basis of the account identifier for the second user account, a profile information message to a second user device associated with the second user via the computer network, the profile information message conveying the first said item of profile identity information, wherein the first said item of profile identity information is known by the second user to be associated with the first user prior to the second user device receiving the profile information message conveying the first said item of profile identity information from the account association server;

receiving, by the account association server via the computer network, a profile identity response message originating from the second user device in response to transmission of the profile information message, the profile identity response message confirming that the first said item of profile identity information has been verified by the second user as being associated with the first user; and establishing, by the account association server, a relationship between the first user account and the second user account at least in response to receipt of the profile identity response message by adding account information for the second user account to the first user account.

2. The method of claim 1, wherein the profile information message comprises a profile information challenge message configured to request the first said item of profile identity information, and wherein said profile information response message comprises a received item of profile identity information, the method further comprising comparing the first said item of profile identity information and the received item of profile identity information, wherein the establishment of the relationship between the first user account and the second user account is performed on the basis of the comparison.

3. The method of claim 1, wherein the account association request message is received from the first user device or a service provider entity associated with the first user account.

4. The method of claim 1, wherein the account association request message comprises at least one of the account identifier for the first user account and the account identifier for the second user account.

5. The method of claim 1, wherein the profile identity response message is received from the second user device or a service provider entity associated with the second user account.

6. The method of claim 1, wherein the token comprises the identifier for said one of the first user account and the second user account.

7. The method of claim 1, further comprising generating the token in response to receipt of the token request message, wherein the token comprises a timestamp relating to at least one of the date and the time that the token was generated.

8. The method of claim 1, further comprising:

identifying, on the basis of the account identifier for the second user account, a second said item of profile identity information, the second said item of profile identity information being associated with the second user;

transmitting, in response to receipt of said profile identity confirmation message, a further profile information message, the further profile information message relating to the second said item of profile identity information; and receiving a further profile identity response message in response to transmission of the profile information message, the further profile identity response message comprising information relating to the second said item of profile identity information;

wherein the relationship between the first user account and the second user account is established further in response to receipt of the further profile confirmation message.

9. The method of claim 8, wherein the further profile information message comprises a further profile information challenge message configured to request the second said item of profile identity information, and wherein said further profile information response message comprises a further received item of profile identity information, the method further comprising comparing the second said item of profile identity information and the further received item of profile identity information, wherein the establishment of the relationship between the first user account and the second user account is performed on the basis of an outcome of the further comparison.

10. The method of claim 8, wherein the further profile information message and the further profile identity response message are sent to and received from respectively, the first user device or a service provider entity associated with the first user account.

11. The method of claim 1, wherein the first user account and the second user account are each held with a financial institution.

12. The method of claim 1, wherein establishing a relationship between said first user account and said second user account comprises adding the first user account to a list of user accounts associated with the second user account.

13. The method of claim 12, wherein establishing a relationship between said first user account and said second user account further comprises adding the second user account to a list of user accounts associated with the first user account.

14. The method of claim 1, wherein the account identifier for the first user account and the identifier for the second user account are unique within the account based system.

15. The method of claim 1, wherein the first said item of profile identity information is rendered on a user interface of the second user device, and the profile identity response message is transmitted by the second user device in response to the second user device receiving user input indicating that the second user has verified the first said item of profile identity information as being associated with the first user.

16. An account association server comprising: at least one memory including computer program code; and
at least one processor in data communication with the at least one memory, wherein the at least one processor is configured to:
receiving, prior to receipt of an account association request message, a token request message in relation to one of a first user account and a second user account;
transmitting a token response message in response to receipt of the token request message, the token response message comprising a token corresponding to said one of the first user account and the second user account;
receive, via a computer network, the account association request having information that identifies the first user account and the second user account, in which the first user account corresponds to a first user of an account based system and the second user account corresponds to a second user of the account based system, each respective user account having an account identifier and one or more items of profile identity information associated with the corresponding user, at least one item of profile identity information having been assured by a trusted identity provider and initially being unavailable to users of the account system other than said corresponding user, the account association request originating from a first user device associated with the first user, and wherein the account association request message comprises the token;
determine, on the basis of the account association request message, the account identifier for the first user account and the account identifier for the second user account wherein the account identifier for said one of the first user account and the second user account is determined on the basis of the token;
identify, on the basis of the account identifier for the first user account, a first said item of profile identity information that is initially unavailable to users of the account system other than said corresponding user, wherein the first said item of profile identity information is associated with the first user but does not itself describe the first user, wherein the first said item of profile identity information is an image that the second user recognizes as being associated with the first user;
transmit, on the basis of the account identifier for the second user account, a profile information message to a second user device associated with the second user via the computer network, the profile information message conveying the first said item of profile identity information, wherein the first said item of profile identity information is known by the second user to be associated with the first user prior to the second user device receiving the profile information message conveying the first said item of profile identity information from the account association server;
receive, via the computer network, a profile identity response message originating from the second user in response to transmission of the profile information message, the profile identity response message confirming that the first said item of profile identity information has been verified by the second user as being associated with the first user; and
establish a relationship between the first user account and the second user account at least in response to receipt of the profile identity response message by adding account information for the second user account to the first user account.

17. A non-transitory computer-readable storage medium comprising computer-executable instructions which, when executed by a processor, cause an account association server to perform a method, the method comprising:
receiving, prior to receipt of an account association request message, a token request message in relation to one of a first user account and a second user account;
transmitting a token response message in response to receipt of the token request message, the token response message comprising a token corresponding to said one of the first user account and the second user account;
receiving, by the account association server via a computer network, the account association request message having information that identifies the first user account and the second user account, in which the first user account corresponds to a first user of an account based system and the second user account corresponds to a second user of the account based system, each respective user account having an account identifier and one or more items of profile identity information associated with the corresponding user, at least one item of profile identity information having been assured by a trusted identity provider and initially being unavailable to users of the account system other than said corresponding user, the account association request originating from a first user device associated with the first user, and wherein the account association request message comprises the token;

determining, by the account association server on the basis of the account association request message, the account identifier for the first user account and the account identifier for the second user account, wherein the account identifier for said one of the first user account and the second user account is determined on the basis of the token;

identifying, by the account association server on the basis of the account identifier for the first user account, a first said item of profile identity information that is initially unavailable to users of the account system other than said corresponding user, wherein the first said item of profile identity information is associated with the first user but does not itself describe the first user, wherein the first said item of profile identity information is an image that the second user recognizes as being associated with the first user;

transmitting, by the account association server on the basis of the account identifier for the second user account, a profile information message to a second user device associated with the second user via the computer network, the profile information message conveying the first said item of profile identity information, wherein the first said item of profile identity information is known by the second user to be associated with the first user prior to the second user device receiving the profile information message conveying the first said item of profile identity information;

receiving, by the account association server via the computer network, a profile identity response message originating from the second user device in response to transmission of the profile information message, the profile identity response message confirming that the first said item of profile identity information has been verified by the second user as being associated with the first user; and establishing, by the account association server, a relationship between the first user account and the second user account at least in response to receipt of the profile identity response message, by adding account information for the second user account to the first user account.

\* \* \* \* \*